(12) United States Patent
Zhang et al.

(10) Patent No.: US 7,942,191 B2
(45) Date of Patent: May 17, 2011

(54) METHOD AND SYSTEM FOR PRODUCING WIDE STEEL STRIP

(75) Inventors: Chao Zhang, Wuhan (CN); Zhonghan Luo, Wuhan (CN); Zemin Fang, Wuhan (CN); Jionghui Mao, Wuhan (CN); Shenglin Chen, Wuhan (CN); Ruoping Wang, Wuhan (CN); Xiangxin Wang, Wuhan (CN)

(73) Assignee: Wuhan Iron and Steel (Group) Corp, Wuhan (CN)

( * ) Notice: Subject to any disclaimer, the term of this patent is extended or adjusted under 35 U.S.C. 154(b) by 0 days.

(21) Appl. No.: 12/780,854

(22) Filed: May 14, 2010

(65) Prior Publication Data
US 2010/0218911 A1 Sep. 2, 2010

Related U.S. Application Data

(63) Continuation of application No. PCT/CN2008/073418, filed on Dec. 10, 2008.

(30) Foreign Application Priority Data

Dec. 11, 2007 (CN) .......................... 2007 1 0168742

(51) Int. Cl.
*B22D 11/124* (2006.01)
*B22D 11/126* (2006.01)
*B22D 27/04* (2006.01)
*B21B 1/46* (2006.01)
*B21B 13/22* (2006.01)
*C21D 8/02* (2006.01)

(52) U.S. Cl. ........ 164/476; 164/477; 164/417; 164/460; 164/493; 164/507; 29/527.7; 148/541; 148/601

(58) Field of Classification Search .................. 164/460, 164/476, 477, 417, 493, 507; 29/527.6, 527.7; 148/541, 542, 579, 601
See application file for complete search history.

(56) References Cited

U.S. PATENT DOCUMENTS

| | | | | |
|---|---|---|---|---|
| 5,461,770 A | * | 10/1995 | Kimura et al. | 29/527.7 |
| 5,657,814 A | * | 8/1997 | Maebara et al. | 164/452 |
| 2004/0261206 A1 | * | 12/2004 | Ehls et al. | 15/77 |

* cited by examiner

*Primary Examiner* — Kevin P Kerns
(74) *Attorney, Agent, or Firm* — Matthias Scholl P.C.; Matthias Scholl

(57) ABSTRACT

A method for producing a wide steel strip using thin slab continuous casting and rolling by the following steps a) casting a molten steel into a thin slab having a thickness of between 50 and 90 mm; b) cutting; c) soaking; d) heating by electromagnetic induction; e) descaling; f) rolling; g) cooling with laminar flow; and h) coiling. The method can effectively control the solution and precipitation of carbon, nitrogen, and sulfide in steel with a low cost. The process is easy and flexible, and steel can be produced in a wide range of categories. Further provided is a system for producing a wide steel strip with thin slab continuous casting and rolling.

8 Claims, 1 Drawing Sheet

METHOD AND SYSTEM FOR PRODUCING WIDE STEEL STRIP

CROSS-REFERENCE TO RELATED APPLICATIONS

This application is a continuation of International Patent Application No. PCT/CN2008/073418 with an international filing date of Dec. 10, 2008, designating the United States, now pending, and further claims priority benefits to Chinese Patent Application No. 200710168742.5 filed Dec. 11, 2007. The contents of all of the aforementioned applications, including any intervening amendments thereto, are incorporated herein by reference

BACKGROUND OF THE INVENTION

1. Field of the Invention

The invention relates to the production of hot-rolled steel strip, and more particularly to a method and system for producing a wide steel strip with thin slab continuous casting and rolling.

2. Description of the Related Art

Nowadays, the methods for producing hot-rolled steel strip include the conventional process and shortened process.

In the conventional process, a thick slab or medium thin slab that is more than or equal to 120 mm in thickness is heated, roughly rolled, finish rolled, cooled with laminar flow, and coiled to yield a steel strip. In the conventional process, a thick slab or medium thin slab is heated to between 1000 and 1350° C., and the solid solution and carbon, nitrogen, and sulfide precipitates in the steel are flexibly controlled to produce a wide range of products. This method is particularly suitable for producing a cold rolled substrate for deep punching and the controlled rolling and controlled cooling of steel, such as pipeline steel. However, the conventional process has a long production line, requiring much equipment and a large investment, which means a high cost.

In the shortened process, a thin slab that is less than or equal to 100 mm in thickness is soaked, finish rolled, cooled with laminar flow, and coiled to yield a steel strip. Examples of the shortened process include a CSP production line, UTSR production line, ISP production line, etc. For the CSP production line and UTSR production line, both the tapping temperature of a soaking furnace and the initial rolling temperature of a hot strip mill are merely 1150° C., while the solid solution temperature of the carbon, nitrogen, and sulfide in the steel is often more than 1250° C., which means the process cannot flexibly control the solid solution and precipitate. In order to produce a hot rolled steel strip with the same quality as that produced by the conventional process, a thin slab with a high content of alloy is required, which means a high cost. In the ISP production line, a thin slab without pretreatment by soaking is roughly rolled into billets with a thickness of between 15 and 25 mm, and then the billets are heated by rapid induction. Since the thin slab does not experience enough soaking before rough rolling, the temperature of the cross-section is uneven, and the cross-section itself is also uneven after rough rolling. Additionally, billets with a thickness of between 15 and 25 mm are too thin and cannot provide a sufficient deformation rate to control the rolling of the thick steel strip under rapid induction heating. Therefore, although thin slab continuous casting and rolling has the advantage of low cost due to the short process, the carbon, nitrogen, and sulfide contents cannot be controlled effectively, which means a limited application scope.

How to solve the disadvantages of the conventional process and the shortened process on the basis of a current hot rolled steel strip production line without additional cost is an urgent problem.

SUMMARY OF THE INVENTION

In view of the above-described problems, it is one objective of the invention to provide a method for producing a wide steel strip with thin slab continuous casting and rolling that has a low cost, flexible process, and can effectively control the solid solution and precipitation of carbon, nitrogen, and sulfide.

It is another objective of the invention to provide a system for producing a wide steel strip with thin slab continuous casting and rolling that has a low cost, flexible process, and can effectively control the solid solution and precipitation of carbon, nitrogen, and sulfide.

To achieve the above objectives, in accordance with one embodiment of the invention, a method is provided for producing a wide steel strip with thin slab continuous casting and rolling that has a low cost, flexible process, and can effectively control the solid solution and precipitation of carbon, nitrogen, and sulfide, the method comprising the steps of:

a) continuously casting a molten steel into a thin slab having a thickness of between 50 and 90 mm and the required width;

b) cutting the thin slab into a fixed-length at the needed weight or size;

c) soaking the thin slab from the directions of length, width, and thickness so as to control the temperature of the thin slab between 980 and 1150° C. and make carbon, nitrogen, and sulfide in a state of solid solution or precipitation;

d) heating the thin slab according to the following situations: for a steel requiring an initial rolling temperature between 980 and 1150° C., heating the thin slab by electromagnetic induction for between 6 and 12 min so as to maintain the temperature; for a steel requiring an initial rolling temperature of between 1151 and 1350° C., heating the thin slab by electromagnetic induction for between 1 and 2 min so as to reach the temperature, and then maintaining the temperature for between 5 and 10 min so as to make the solid solution of carbon, nitrogen, and sulfide complete;

e) descaling the thin slab with high pressure water so as to remove the iron scales produced during soaking and electromagnetic induction heating;

f) conventionally rolling the thin slab at a temperature of between 980 and 1350° C., controlling the finishing temperature to between 750 and 980° C., and rolling the thin slab into a steel strip having the required thickness;

g) cooling the steel strip with conventional laminar flow to between 550 and 700° C.; and h) coiling the steel strip.

In step a), the process of rough rolling can be omitted, so that deformation energy consumption is saved, and part of the carbon, nitrogen, and sulfide is in a state of solid solution, with the other part precipitates.

In a class of this embodiment, in step c), before soaking, the thin slab having a fixed-length is descaled with high-pressure water so as to remove the iron scale and mould powder produced during continuous casting.

In a class of this embodiment, in step d), inert protective gas is injected around the thin slab during heating by electromagnetic induction so as to minimize the oxidation loss on the surface of the thin slab.

In a class of this embodiment, in step f), during rolling, a mature deformation rate distribution system is adopted, utilizing cooling water, carbon, nitrogen, and sulfide in a state of solid solution or precipitation to control the recrystallization.

In the invention, the laminar flow cooling can further control the precipitation of carbon, nitrogen, and sulfide and provide conditions for grain size evolution during and after phase transition.

In accordance with another embodiment of the invention, a system is provided for producing a wide steel strip with thin slab continuous casting and rolling that has a low cost, flexible process, and can effectively control the solid solution and precipitation of carbon, nitrogen, and sulfide, the system comprising:

a) a slab caster;
b) a slab cutting device;
c) a roller hearth heating furnace;
d) a heating furnace that uses electromagnetic induction;
e) a descaling device that uses high pressure water;
f) a slab hot rolling mill;
g) a laminar flow cooling device;
h) a strip coiler; and
i) a cooling water spray device;

wherein:
1) the slab caster, slab cutting device, roller hearth heating furnace, heating furnace that uses electromagnetic induction, descaling device that uses high pressure water, slab hot rolling mill, laminar flow cooling device, and strip coiler are disposed sequentially in line;
2) the cooling water spray device is disposed within the frame of the slab hot rolling mill; and
3) the heating furnace that uses electromagnetic induction comprises two power-adjustable electromagnetic induction heating sections: a rapid heating section and a holding section, wherein the rapid heating section is disposed at the side of the roller hearth heating furnace, and the holding section is disposed at the side of the descaling device that uses high pressure water.

In a class of this embodiment, the rapid heating section is heated by high power electromagnetic induction so as to increase the temperature of the thin slab to the required rolling temperature in a short time.

In a class of this embodiment, the holding section is heated by low power electromagnetic induction so as to maintain the initial rolling temperature of the thin slab over a set time.

In a class of this embodiment, a second descaling device that uses high pressure water is disposed between the slab cutting device and the roller hearth heating furnace sequentially so as to descale the thin slab before soaking.

In a class of this embodiment, an inert protective gas input device is disposed in both the rapid heating section and the holding section of the heating furnace that uses electromagnetic induction so as to reduce the oxidation loss of the thin slab.

The advantages of the invention are summarized below: the thin slab is soaked to a temperature that is equal to or lower than the initial rolling temperature, and is then heated by electromagnetic induction, which is rapid and highly effective, so as to maintain the initial rolling temperature, or rapidly increase to and then maintain the initial rolling temperature, for a predetermined period, so that the solid solution of carbon, nitrogen, and sulfide is complete. Thereby, on the one hand, the disadvantages of the shortened process are solved, such as the demand for materials with a high content of alloy, the low soaking temperature of the thin slabs, the uneven cross-section temperature and uneven cross-section itself, the insufficient deformation rate, etc. On the other hand, the disadvantages of the conventional process are solved, such as long production line, demand of much equipment, large investment, high cost, etc. In the invention, the solid solution and precipitation of carbon, nitrogen, and sulfide can be effectively controlled, and steels produced by conventional hot rolling mills, such as low carbon steel for cold rolling, controlled rolling and controlled cooling steel, oriented silicon steel for cold rolling, etc., can also be produced by thin slabs. The production cost is low, the process is easy and flexible, the produced steel has good quality, and it is possible to produce a rich variety of steels.

BRIEF DESCRIPTION OF THE DRAWINGS

The invention is described hereinbelow with reference to the accompanying drawings, in which.

DETAILED DESCRIPTION OF THE EMBODIMENTS

Figure 1:
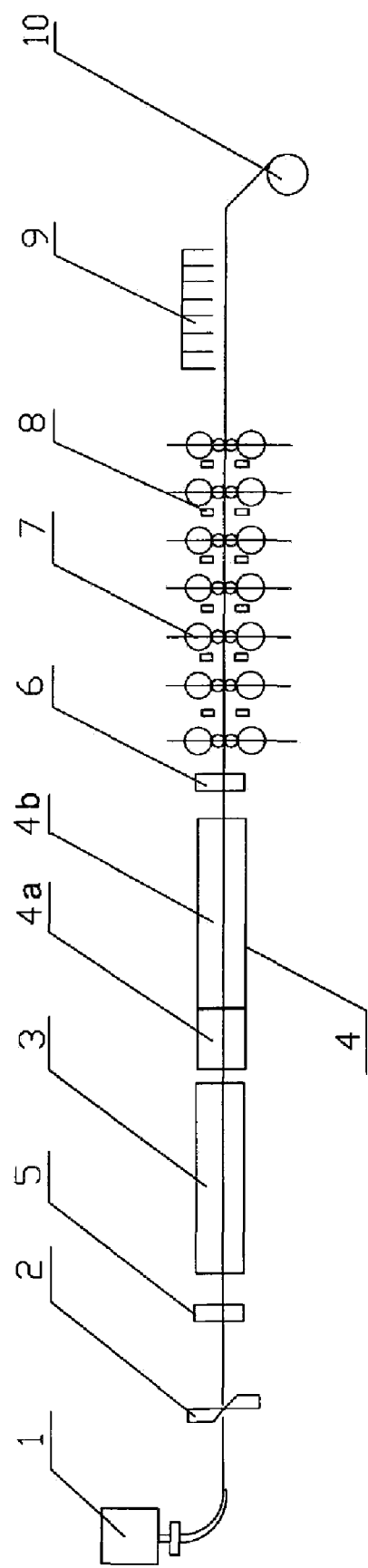
FIG. 1 is a schematic diagram of the connection relationships between the devices of a system for producing a wide steel strip with thin slab continuous casting and rolling according to one embodiment of the invention.

For further illustrating the invention, experiments detailing a method and a system for producing a wide steel strip with thin slab continuous casting and rolling are described below. It should be noted that the following examples are intended to describe and not to limit the invention.

As shown in FIG. 1, a system for producing a wide steel strip with thin slab continuous casting and rolling comprises a slab caster 1, a slab cutting device 2, a second descaling device that uses high pressure water 5, a roller hearth heating furnace 3, a heating furnace that uses electromagnetic induction 4, a descaling device that uses high pressure water 6, a slab hot rolling mill 7, a laminar flow cooling device 9, and a strip coiler 10, all of which are disposed in order by series connection. The shortest length of the roller hearth heating furnace 3 is equal to the sum of the length of the heating section of the heating furnace 3 and the length of the largest single thin slab. If the length of the roller hearth heating furnace 3 is too short, the soaking effect is bad. If the length of the roller hearth heating furnace 3 is too long, the energy-saving effect is bad. The proper length of the roller hearth heating furnace 3 ensures the soaking of the thin slab from the length, width, and thickness directions, along with low energy consumption.

The heating furnace that uses electromagnetic induction 4 comprises two power-adjustable electromagnetic induction heating sections: a rapid heating section 4a and a holding section 4b. The rapid heating section 4a is disposed at the side of the roller hearth heating furnace 3, and the holding section 4b is disposed at the side of the descaling device that uses high pressure water 6. The heating power (generally high power) of the rapid heating section 4a can be modified to heat thin slabs to the required temperature in a short time. The heating power (generally low power) of the holding section 4b can be modified to maintain the temperature of thin slabs, and the induction heating time can be adjusted by controlling the operating speed of the thin slabs. An inert protective gas input device is disposed in both the rapid heating section 4a and the holding section 4b of the heating furnace that uses electromagnetic induction 4 so as to reduce the oxidation loss on the surface of the thin slabs.

A cooling water spray device 8 is disposed within the frame of the slab hot rolling mill 7 and cooperates with the load distribution of the slab hot rolling mill 7 to control the precipitation of carbon, nitrogen, and sulfide in the steel.

A production process that uses the system for producing a wide steel strip with thin slab continuous casting and rolling is described below.

Example 1

A qualified molten steel having a weight percentage of C, 0.08, Si, 0.23, Mn, 1.43, P, 0.012, S, 0.008, and Nb, 0.034 was continuously cast by a slab caster 1 into a thin slab with a thickness of 70 mm and a width that was equal to or more than 1250 mm. The output temperature of the thin slab from the slab caster 1 was around 1000° C. The thin slab was then cut with a slab cutting device 2 into a fixed length of 45 m, descaled with a second descaling device that used high pressure water 5 with a water pressure of between 10 and 38 Mpa to remove the iron scales and mould powder produced during the continuous casting, and then soaked to 1150° C. with a roller hearth heating furnace 3 from the length, width, and thickness directions. A sample analysis showed that the size of the carbonitride Nb(CN) in the steel was between 200 and 500 nm.

The obtained thin slab was transferred to a heating furnace that used electromagnetic induction 4 equipped with an inert protective gas input device, heated rapidly to 1260° C. with the rapid heating section (high power) 4a within 1 to 2 min to achieve a solid solution temperature for the carbon, nitrogen, and sulfide in the steel. Subsequently, the temperature was maintained with a holding section (low power) 4b for between 5 and 10 min so that the solid solution of carbon, nitrogen, and sulfide in the steel was complete. Observations showed that there was no test sample in the visual field, which meant the solid solution of carbonitride Nb(CN) had been complete.

The thin slab from the heating furnace that used electromagnetic induction 4 was descaled with a descaling device that used high pressure water 6 with a water pressure of between 10 and 38 Mpa to remove the iron scales, and was then rolled with a slab hot rolling mill 7. With the cooperation of a cooling water spray device 8 disposed within the frame of the slab hot rolling mill 7, the thin slab was rolled into a wide steel strip having a thickness of 8.9 mm from an initial rolling temperature of 1260° C. to a finish rolling temperature of 810° C. Since the solid solution of Nb(CN) had been completed during the electromagnetic induction heating, with the decrease in temperature during rolling, Nb(CN) precipitated in the form of a small and dispersed phase, which provided convenience for the nucleation of recrystallization, impeded the expansion of recrystallized grains, and refined the recrystallized grains.

The output temperature of the wide steel strip from the slab hot rolling mill 7 was about 810° C., and decreased to 610° C. after cooling by a laminar flow cooling device 9, so that the transformation from austenite to ferrite was realized. Since the austenite grains had already been refined completely during rolling, when they were transformed into ferrite, much smaller grains were obtained. Finally, the wide steel strip was coiled with a strip coiler 10 to yield a steel coil having the needed weight or size.

A sample analysis in the rolling stage showed that the carbonitride Nb(CN) had precipitated completely, the product size was between 50 and 300 nm, and the austenite grains were refined, all of which benefited from the recrystallization. A sample analysis of the steel coils showed that they had a tensile strength of 530 Mpa, a yield strength of 420 Mpa, and an ASTM12 grade grain size. Therefore, the invention can effectively control the solid solution and precipitation of carbon, nitrogen, and sulfide in steel, the production cost is low, and the produced steel has high quality.

Example 2

A qualified molten steel having a weight percentage of C, 0.04, Si, 0.02, Mn, 0.20, P, 0.010, S, 0.013, Nb, 0.034, and Al, 0.04 was continuously cast by a slab caster 1 into a thin slab having a thickness of 70 mm and a width of equal to or more than 1250 mm. The output temperature of the thin slab from the slab caster 1 was around 1000° C. The thin slab was then cut with a slab cutting device 2 into a fixed length of 45 m, descaled with a second descaling device that used high pressure water 5 with a water pressure of between 10 and 38 Mpa to remove the iron scales and mould powder produced during the continuous casting, and soaked to 1100° C. with a roller hearth heating furnace 3 from the length, width, and thickness directions. A sample analysis showed that the size of the nitride AlN in the steel was between 200 and 500 nm.

The obtained thin slab was transferred to a heating furnace that used electromagnetic induction 4 equipped with an inert protective gas input device and heated rapidly to 1320° C. with a rapid heating section (high power) 4a within 1 to 2 min. Subsequently, the 1320° C. temperature was maintained with a holding section (low power) 4b for between 6 and 10 min so that the solid solution of AlN in the steel was complete. Observations showed that there was no test sample in the visual field, which meant the solid solution of AlN had been complete.

The thin slab from the heating furnace that used electromagnetic induction 4 was descaled with a descaling device that used high pressure water 6 with a water pressure of between 10 and 38 Mpa to remove the iron scales, and then rolled with a slab hot rolling mill 7. With the cooperation of a cooling water spray device 8 disposed within the frame of the slab hot rolling mill 7, the thin slab was rolled into a wide steel strip having a thickness of 2.75 mm at a finish rolling temperature of 890° C. Since the finish rolling temperature was high, the AlN in steel did not precipitate. The wide steel strip was cooled to 550° C. by a laminar flow cooling device 9. Since the cooling temperature was low, the AlN in the steel could not precipitate. Finally, the wide steel strip was coiled with a strip coiler 10 to yield a steel coil having the needed weight or size.

A sample analysis in the rolling stage showed that the solid solution of AlN was complete, and since the laminar flow cooling was rapid, the AlN was still dissolved in the ferrite. No AlN grains were found in tests on the products.

Example 3

A qualified molten steel having a weight percentage of C, 0.08, Si, 0.23, Mn, 1.43, P, 0.012, S, 0.008, and Nb, 0.034 was continuously cast by a slab caster 1 into a thin slab having a thickness of 70 mm and a width of equal to or more than 1250 mm. The output temperature of the thin slab from the slab caster 1 was around 1000° C. The thin slab was then cut with a slab cutting device 2 into a fixed length of 45 m, descaled with a second descaling device that used high pressure water 5 with a water pressure of between 10 and 38 Mpa to remove the iron scales and mould powder produced during the continuous casting, and soaked to 1100° C. with a roller hearth heating furnace 3 from the length, width, and thickness directions. A sample analysis showed that the size of the carbonitride Nb(CN) in the steel was between 200 and 500 nm.

The obtained thin slab was transferred to a heating furnace that used electromagnetic induction 4 equipped with an inert protective gas input device, maintained at a rolling temperature of 1100° C. for between 6 and 12 min by modifying the power of a rapid heating section 4a and a holding section 4b so that the carbon, nitrogen, and sulfide in the steel stayed in a state of solid solution and did not precipitate. Observations showed that there was no test sample in the visual field, which meant the solid solution of carbonitride Nb(CN) had been complete.

The thin slab from the heating furnace that used electromagnetic induction 4 was descaled with a descaling device that used high pressure water 6 with a water pressure of between 10 and 38 Mpa to remove the iron scales, and was then rolled with a slab hot rolling mill 7. With the cooperation of a cooling water spray device 8 disposed within the frame of the slab hot rolling mill 7, the thin slab was rolled into a wide steel strip having a thickness of 8.8 mm from an initial rolling temperature of 1100° C. to a finish rolling temperature of 800° C. Since the solid solution of Nb(CN) had been completed during the electromagnetic induction heating, with the decrease in the temperature during rolling, Nb(CN) precipitated in the form of a small and dispersed phase, which provided convenience for the nucleation of recrystallization, impeded the expansion of recrystallized grains, and refined the recrystallized grains.

The output temperature of the wide steel strip from the slab hot rolling mill 7 was about 800° C., and decreased to 590° C. after cooling by a laminar flow cooling device 9, so that the transformation from austenite to ferrite was realized. Finally, the wide steel strip was coiled with a strip coiler 10 to yield a steel coil with the needed weight or size.

A sample analysis in the rolling stage showed that the carbonitride Nb(CN) had precipitated completely, with a product size between 100 and 340 nm. A sample analysis of the steel coils showed a tensile strength of 500 Mpa, a yield strength of 390 Mpa, and an ASTM10 grade grain size.

From Examples 1-3, the method of the invention is suitable for producing a steel requiring an initial rolling temperature between 1151 and 1350° C., and can effectively control the solid solution and precipitation of carbon, nitrogen, and sulfide. For producing a steel requiring an initial rolling temperature between 980 and 1150° C., the effect is also good.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for producing a wide steel strip with thin slab continuous casting and rolling, comprising the steps of:
    a) continuously casting a molten steel into a thin slab having a thickness of between 50 and 90 mm;
    b) cutting said thin slab into a fixed-length as needed;
    c) soaking said thin slab from the directions of the length, width, and thickness so as to control the temperature of said thin slab between 980 and 1150° C.;
    d) heating said thin slab according to the following situations: for a steel requiring an initial rolling temperature of between 980 and 1150° C., heating said thin slab by electromagnetic induction for between 6 and 12 min so as to maintain the temperature; for a steel requiring an initial rolling temperature of between 1151 and 1350° C., heating said thin slab by electromagnetic induction for between 1 and 2 min so as to achieve the temperature, and then maintaining the temperature for between 5 and 10 min;
    e) descaling said thin slab with high pressure water;
    f) conventionally rolling said thin slab at a temperature of between 980 and 1350° C., controlling the finishing temperature at between 750 and 980° C., and rolling said thin slab into a steel strip having the required thickness;
    g) cooling said steel strip with laminar flow to between 550 and 700° C.; and
    h) coiling said steel strip.

2. The method of claim 1, wherein in step c), before soaking, said thin slab having a fixed-length is descaled with high-pressure water, whereby removing iron scale and mould powder produced during the continuous casting.

3. The method of claim 2, wherein in step d), an inert protective gas is injected around said thin slab during heating by electromagnetic induction.

4. The method of claim 1, wherein in step d), an inert protective gas is injected around said thin slab during heating by electromagnetic induction.

5. A system for producing a wide steel strip with thin slab continuous casting and rolling, comprising:
    a) a slab caster;
    b) a slab cutting device;
    c) a roller hearth heating furnace;
    d) a heating furnace that uses electromagnetic induction;
    e) a descaling device that uses high pressure water;
    f) a slab hot rolling mill;
    g) a laminar flow cooling device;
    h) a strip coiler; and
    i) a cooling water spray device;
wherein,
    said slab caster, said slab cutting device, said roller hearth heating furnace, said heating furnace that uses electromagnetic induction, said descaling device that uses high pressure water, said slab hot rolling mill, said laminar flow cooling device, and said strip coiler are disposed in order by a series connection;
    said cooling water spray device is disposed within the frame of said slab hot rolling mill;
    said heating furnace that uses electromagnetic induction comprises two power-adjustable electromagnetic induction heating sections: a rapid heating section and a holding section, wherein said rapid heating section is disposed at the side of said roller hearth heating furnace, and said holding section is disposed at the side of said descaling device that uses high pressure water.

6. The system of claim 5, wherein a second descaling device that uses high pressure water is disposed between said slab cutting device and said roller hearth heating furnace in a series connection.

7. The system of claim 6, wherein an inert protective gas input device is disposed in both said rapid heating section and said holding section of said heating furnace that uses electromagnetic induction.

8. The system of claim 5, wherein an inert protective gas input device is disposed in both said rapid heating section and said holding section of said heating furnace that uses electromagnetic induction.

* * * * *